Figure 1:
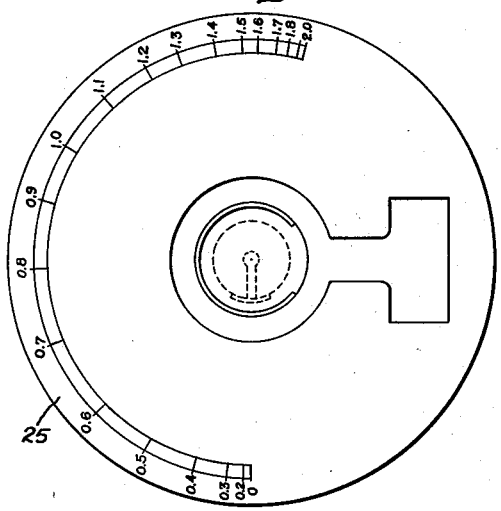

Oct. 21, 1941.  S. C. HOARE  2,260,026

REPULSION-ATTRACTION TYPE ELECTRICAL MEASURING INSTRUMENT

Filed Jan. 5, 1940

Inventor:
Stephen C. Hoare,
by Harry E. Dunham
His Attorney.

Patented Oct. 21, 1941

2,260,026

UNITED STATES PATENT OFFICE 2,260,026

REPULSION-ATTRACTION TYPE ELECTRICAL MEASURING INSTRUMENT

Stephen C. Hoare, Manchester, Mass., assignor to General Electric Company, a corporation of New York Application January 5, 1940, Serial No. 312,529

3 Claims. (Cl. 171—95)

This invention relates to electrical measuring instruments and more particularly to electrical measuring instruments of the iron vane deflection type.

It is an object of my invention to provide an electrical measuring instrument which shall be suitable for large angular deflections and long scales.

It is another object of my invention to provide an electrical measuring instrument of the foregoing character which shall be capable of producing a relatively high torque for a given amount of current.

It is still another object of my invention to provide such instruments having an improved scale distribution with a relatively open scale at its upper and lower ends, and without the presence of high losses in the exciting winding.

It is a further object of my invention to provide an electrical measuring instrument of the repulsion-attraction type in which the scale distribution may be adjusted.

Further objects and advantages of my invention will become apparent as the description proceeds.

In my copending application Serial No. 166,360, filed September 29, 1937, Patent 2,183,566, December 19, 1939, entitled "Repulsion-attraction type current responsive instruments," there is described and claimed an electrical measuring instrument which operates on what is called the repulsion-attraction principle. In that instrument, a movable vane positioned for rotation within a current coil cooperates with a tapered repulsion iron and at least one attraction iron to provide an instrument in which the scale is considerably opened up at the up-scale end and which has considerably more torque than instruments of this character which have been produced heretofore.

The present inventon offers an alternative solution to the problem. I have provided an instrument in which the attraction principle is combined with the repulsion principle by the employment of a similar movable vane and repulsion iron but which does not require an attraction iron. In carrying out my invention in its preferred form, a current coil and a movable vane are employed as in instruments of known types. However, the auxiliary or attraction iron disclosed in my patent above mentioned is dispensed with and its function as well as additional functions are performed by mounting the movable iron or vane in eccentric relation to the rim of the current carrying coil. The main or stationary repulsion iron is tapered toward the up-scale position of the movable vane. As the movable vane moves from the zero end of the scale, the attraction force on the vane produced by the coil is gradually reduced but this reduction is also accompanied by a reduction in the repulsive force produced by the repulsion iron. However, as the movable vane passes the neutral position, the repulsive force continues to drop off but the attractive force produced by the coil begins to increase. Consequently, the scale of the instrument is considerably opened up at both its zero and up-scale ends. An instrument of this character is characterized by a relatively high torque for a given current thereby providing high sensitivity. Also, the instrument is particularly suited for a long scale.

Figure 2:
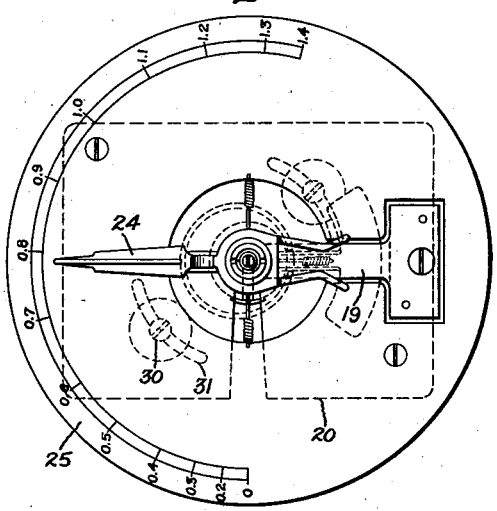
Figure 4:
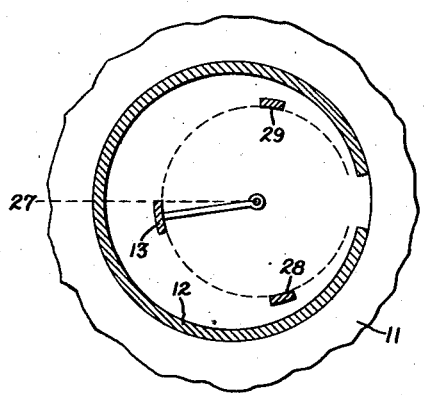
Figure 3:
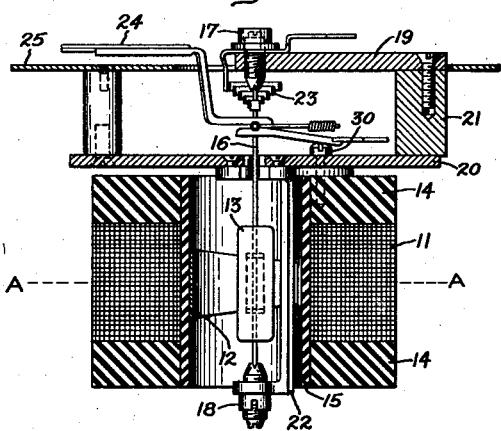
Figure 5:
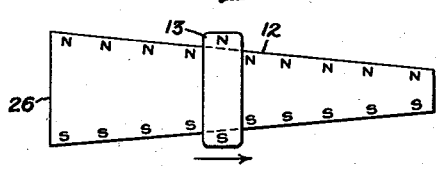
Figure 6:
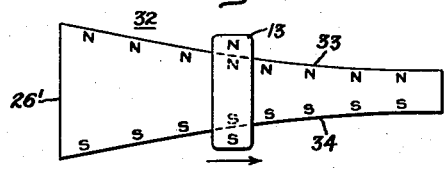

My invention may be understood more readily from the following detailed description when considered in connection with the accompanying drawing and those features of the invention which are believed to be novel and patentable will be pointed out in the appended claims. In the drawing Fig. 1 is a plan view showing the scale distribution obtained in a conventional moving vane-type measuring instrument. Fig. 2 is a plan view of a measuring instrument arranged in accordance with my invention showing the scale distribution and the pointer carried by the movable element. Fig. 3 is a longitudinal sectional view of the arrangement of Fig. 2. Fig. 4 is a transverse sectional view taken along the line A—A of Fig. 3 but drawn to a different scale. Fig. 5 is a diagram showing a development of the surfaces of the stationary repulsion iron and the movable iron used in the arrangement of Figs. 1 to 4. Fig. 6 is a diagram showing a development of the surfaces of the stationary repulsion iron and the movable iron in a modified arrangement.

In Fig. 1 I have illustrated the scale distribution of the usual movable vane type measuring instrument in which the movable vane is concentrically mounted within the flux producing coil. Reference to this figure indicates that the scale is considerably crowded both at the zero and up-scale positions. In Fig. 2 a measuring instrument is illustrated in which the movable iron or vane is pivotally mounted in an eccentric position with respect to the rim of the field coil in order to produce a long scale and to provide a material improvement in scale distribution and the sensitivity of the instrument.

Referring to Figs. 2 and 3, the apparatus consists basically of a flux producing element in the form of a current conducting winding 11 surrounding a stationary magnetizable element or iron 12 and a pivotally mounted revolvable vane or iron 13. The movable vane 13 is so related to the stationary iron 12 that an axially magnetic field produced by an electric current flowing through the winding 11 induces magnetic poles in the stationary and movable irons and a repulsive force brings about movement of the vane 13. As indicated in the drawing, the movable element 13 is pivotally mounted within the current conducting winding 11 so that the movable vane lies close to the repulsion iron and the rim of the coil at both the zero and up-scale ends of the scale.

The coil 11 may be wound upon a spool formed by a pair of end pieces 14 surrounding a hollow cylinder or winding form 15. The parts 14 and 15 are preferably non-magnetic in character and may be composed of a suitable insulating material such as a phenolic condensation product. If desired, the parts 14 and 15 may be molded in one piece and, furthermore, the stationary repulsion iron 12 may also be molded into the winding form 15.

The magnetizable members 12 and 13 may be composed of any suitable magnetizable material, such as silicon steel or soft iron, but I prefer to use a relatively high permeability material such as an alloy of 46 to 48 per cent nickel and the remainder iron or an alloy having approximately 78½ per cent nickel and the remainder iron, such as that described in the United States Patent 1,586,884 to G. W. Elmen. Because of the common use of soft iron in electrical instruments of the moving vane type, parts such as the members 12 and 13 are commonly referred to as "irons" and I shall employ the term "irons" in both the specification and claims to designate any suitable magnetizable material or alloy.

A shaft 16 is provided for carrying the movable iron 13. In the arrangement illustrated the shaft is mounted eccentrically with respect to the axis of and within the winding form 15, and the moving vane 13 is offset from the shaft 16 so that the vane 13 will be carried along the inner surface of the stationary repulsion iron 12 which lines the substantially circular cylindrical inner surfaces of the winding form 15. The shaft 16 is mounted in suitable bearings 17 and 18, the upper bearing 17 being mounted in a cover member 19 supported from a bed plate 20 by an intermediate member 21, while the lower bearing 18 is supported from the bed plate 20 by means of a depending arm 22. A suitable biasing spring 23 is provided for obtaining the desired control torque on the instrument. For indicating instruments I further provide a pointer 24 carried by the shaft 16 and a scale 25 having graduations cooperating with the pointer.

The shape of the stationary repulsion iron 12 and its position with respect to the movable iron 13 may be explained more readily by reference to the sectional view of Fig. 4 and the diagram of Fig. 5 showing the developed surfaces. It will be seen that the axial length of the movable iron 13 is approximately the same as the width of the base portion 26 of the main or repulsion iron 12 which is wedge-shaped and which tapers in the up-scale direction of movement of the movable vane 13.

As already indicated, the instrument operates by a force due to magnetic repulsion between the stationary repulsion vane and the movable vane 13 and by a force due to magnetic attraction between the movable vane 13 and the current conducting coil 11. It will be understood that for the zero position of the instrument the movable vane 13 will be near the left-hand end of the repulsion iron 12 in Fig. 5. As the pointer moves up-scale the vane 13 moves to the right in the direction of the arrow toward the narrow end of the wedge or repulsion iron 12. Owing to the current flowing from the winding 11 the upper edge of the iron 12 will be magnetized with one polarity and the lower edge will be magnetized with the opposite polarity, assumed to be north and south respectively for the sake of illustration. The upper end of the movable vane 13 will be magnetized with the same polarity as the upper edge of the iron 12, in this case north, and the lower end will be magnetized with the same polarity as the lower edge of the iron 12, in this case south. Under the foregoing conditions, magnetic repulsion between like poles will tend to drive the vane 13 in the direction of the arrow away from the position opposite the base 26 of the wedge where the like poles are close together toward the right or narrow portion of the wedge where the like poles are further apart. As the current increases and the vane 13 moves up-scale, the effect of greater current is balanced by the fact that the control spring 23 offers greater opposition when the vane moves to the right and also by the fact that the like poles gradually become farther apart so that the force of repulsion for a given current becomes less and less. The consequence, if repulsion alone is relied upon, particularly when the angular deflection becomes large, is that larger and larger increments of current become necessary to produce a given increment of angular deflection as the instrument moves toward the up-scale position. Stated in another way, the scale becomes more and more crowded toward the upper end. Fig. 1 illustrates such a scale distribution which would be obtained if the movable vane 13 were mounted concentrically within the current coil 11 and about the repulsion iron 12. It will thus be seen that with a single repulsion instrument any attempt to extend the scale is practically impossible because the operating forces at the upper end of the scale become so weak that severe crowding results. Furthermore, the losses in the coil would be prohibitive.

By mounting the movable iron 13 eccentrically with respect to the rim of the current carrying coil 11, the scale distribution may be greatly improved and the scale opened up at the upper end by introducing a magnetic attractive force which becomes greater as the vane 13 moves up-scale from the mid-point or a so-called neutral position. It will be apparent that the magnetic field produced by the current flow through the winding 11 produces an attractive force on the movable vane 13 which is comparatively large when the vane 13 is positioned close to the rim of the coil and which decreases as the movable vane 13 recedes from this position. Referring to Fig. 4, in which the movable iron vane 13 is shown pivotally mounted in an eccentric manner with respect to the current coil 11, if the movable vane 13 is arbitrarily positioned below the half-way or so-called neutral position, as indicated by the line 27, the vane will tend to move toward the region of higher flux density or near the rim of the coil as indicated at 28. On the other hand, if the movable vane 13 is positioned beyond the mid-way position or above the line 27, it will again tend to move toward the rim of the coil but this time to a position such as 29. It will thus be seen that with no fixed iron, the movement of the vane will be either down scale or up scale depending upon whether the vane is situated below or above the half-way position.

Consider now the effect on the movement of the vane 13 of the resultant force due to the repulsive force produced by the repulsion iron 12 and the attractive force produced by pivotally mounting the movable vane eccentrically with respect to the principal axis of the current coil 11. As already explained, the movable vane 13 tends to move toward the right or up-scale position due to the repulsive force produced by the stationary iron 12. If this wedge-shaped repulsion iron 12 be fixed inside the coil 11, as shown in Figs. 3 and 4, the repulsive force on the movable vane 13 can be made predominant to overcome the down-scale tendency of the vane due to the attractive force of the coil, when the latter is excited, and the zero scale position of the vane will then be placed near the down-scale rim of the coil. With field excitation the end torque on the movable vane is, therefore, in a positive or up-scale direction. When the vane assumes a position much beyond the half-way point 27, the repulsive force due to the stationary iron 12 falls off rapidly and would result in crowding of the scale but along this region the attractive force from the coil becomes predominant so that an additional force comes into play. The vane in its movement in a clockwise direction from the half-way position 27 experiences an increasingly greater torque or attractive force due to the eccentric pivotal mounting which tends to pull the vane toward the rim of the coil at the up-scale position. The extra effect makes up for the decreasing repulsive forces thereby opening up and lengthening the scale of the instrument; the result is a material improvement in scale distribution and instrument sensitivity.

In the arrangement of Fig. 2, the scale 25 subtends an arc of approximately 194°. However, by determining the optimum degree of eccentricity with suitable shapes of coil 11 and with a properly shaped repulsion iron, the scale may be lengthened to an angle of 250° or more. In prior arrangements employing the attraction-repulsion principle it is practically impossible to extend the scale very far beyond 90° or 100° of arc, because any attempt at extending the scale would result in the effect of repulsion dying out long before the movable vane comes within the influence of the attractive effort of the coil rim. In instruments constructed according to the present invention the wedge-shaped repulsion iron is so shaped and disposed that despite the longer scale arc the repulsive torque is carried through far enough to insure a generous overlap with the attractive torque from the rim of the coil.

A plurality of screws 30 support the current winding 11 by engaging the end portion 14 of the insulating spool. The screws are mounted in arcuate slots 31 of the bed plate 20, and with this arrangement the repulsion iron may be moved relative to the scale 25 to adjust the zero of the instrument.

In a modification shown in Fig. 6, I have illustrated a repulsion iron 32 in which the outer edges are concave, as shown at 33 and 34. This arrangement enables the scale to be extended or opened up near the zero region. I wish to point out that various other shapes may be employed and that the scale can be given an open or closed distribution in the zero and up-scale regions, as desired, by proper shaping of the repulsion iron and positioning of the various parts.

As is well known to those skilled in the art, the instrument will have its coil 11 wound with a relatively small number of turns of heavy wire when serving as an ammeter and a large number of turns of fine wire when serving as a voltmeter, or the conversion to an ammeter or voltmeter may be made by connecting a shunt across the coil to form an ammeter and a high resistance in series with it to form a voltmeter instead of changing the winding.

I have herein shown and particularly described certain embodiments of my invention and certain methods of operation embraced therein for the purpose of explaining its principle of operation and showing its application but it will be obvious to those skilled in the art that modifications and variations are possible and I aim therefore to cover all such modifications and variations as fall within the scope of my invention which is defined in the appended claims.

What I claim as new and desire to secure by Letters Patent of the United States, is:

1. A long scale current responsive instrument comprising a substantially cylindrical hollow winding form, a current conducting winding surrounding said form, a member mounted pivotally within said winding form and carrying a magnetizable vane spaced from the inner cylindrical surface of said winding form, a stationary magnetizable member of substantially wedge-shape bent to conform to the inner surface of said winding form, the base of said wedge being substantially parallel with the axis of said winding form and the edges of said wedge forming converging helices on the inner surface of said form, and means for mounting said magnetizable vane for rotation about an axis which is displaced from the axis of said winding and stationary magnetizable member, whereby said vane experiences a decreasing attractive force from said winding and a decreasing repulsive force from said stationary member in moving from the down-scale position to the midway position under the predominant influence of said repulsive force, and whereby said vane experiences a decreasing repulsive force from said stationary member and an increasing attractive force from said winding when moving from said midway position to the up-scale position under the combined influence of said forces operating to move said vane in the same direction.

2. A current responsive instrument comprising a current conducting coil having an opening therein extending substantially parallel with the magnetic axis of said coil, a pair of relatively rotatable magnetic members eccentrically mounted with respect to each other within said opening and adapted to be magnetized in accordance with the energization of said coil, said members having a given direction of relative rotation referred to as up-scale, the axis of rotation being substantially parallel but displaced axially from the magnetic axis of the coil, one of said members comprising a repulsion iron extending circumferentially along the surface of a cylinder having an axis substantially parallel with the magnetic axis of said coil, whereby a repulsion force is applied to the movable element which tends to move said element up-scale and which becomes progressively less in magnitude as said element moves in the up-scale direction, and whereby an attractive force is applied to the movable element which tends to move said element down scale when said element is between the zero and half way position of the scale and which become progressively less in magnitude as said element moves from the zero to the half way position, but which attractive force reverses in direction approximately at the half way position of said movable element thereby tending to move said element up-scale, said attractive force becoming progressively greater as said movable element moves from the half way position in the up-scale direction.

3. An electrical measuring instrument comprising a current conducting coil adapted to be energized in accordance with a quantity to be measured, stationary and movable irons disposed in inductive relation to said coil, said movable iron being biased to oppose motion in a given direction referred to as the up-scale direction, said stationary iron including a repulsion iron having edges magnetized with the same polarity as adjacent ends of said movable iron and being tapered so that the distances between the ends of said movable iron and edges of said repulsion iron become greater as the movable iron moves up-scale, and means for mounting said movable iron in eccentric relation to said current conducting coil and stationary iron whereby an attractive force is produced on said movable iron by the flux produced by said coil which attractive force is substantially a maximum in the down scale direction when said movable iron is at the zero position and substantially a maximum in the up-scale direction when said movable iron is at the up-scale position.

STEPHEN C. HOARE.